(12) United States Patent
Compton et al.

(10) Patent No.: US 9,841,076 B2
(45) Date of Patent: Dec. 12, 2017

(54) CUSHION MODULE FOR ASSESSING COMFORTABILITY

(71) Applicant: Ford Global Technologies, LLC, Dearborn, MI (US)

(72) Inventors: Grant A. Compton, Livonia, MI (US); John Wayne Jaranson, Dearborn, MI (US); Michael M. Azzouz, Livonia, MI (US); Tejaswi Nandam, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/096,369

(22) Filed: Apr. 12, 2016

(65) Prior Publication Data

US 2017/0292578 A1    Oct. 12, 2017

(51) Int. Cl.

| | |
|---|---|
| G01N 19/00 | (2006.01) |
| F16F 9/32 | (2006.01) |
| A47C 31/12 | (2006.01) |
| F16F 9/02 | (2006.01) |
| F16F 9/43 | (2006.01) |
| G01B 7/28 | (2006.01) |
| G01L 19/00 | (2006.01) |

(52) U.S. Cl.
CPC .......... *F16F 9/3292* (2013.01); *A47C 31/126* (2013.01); *F16F 9/0218* (2013.01); *F16F 9/0281* (2013.01); *F16F 9/43* (2013.01); *G01B 7/28* (2013.01); *G01L 19/0092* (2013.01); *F16F 2222/126* (2013.01); *F16F 2228/066* (2013.01); *F16F 2236/04* (2013.01)

(58) Field of Classification Search
CPC ...... F16F 9/3292; F16F 9/0218; F16F 9/0281; F16F 9/43; F16F 2222/126; F16F 2236/04; A47C 31/126; G01B 7/28; G01L 19/0092
USPC .......................................... 73/804
See application file for complete search history.

(56) References Cited

U.S. PATENT DOCUMENTS

| | | | |
|---|---|---|---|
| 3,752,432 A | 8/1973 | Lowe | |
| 4,890,235 A | 12/1989 | Reger et al. | |
| 5,051,673 A * | 9/1991 | Goodwin | A61G 7/0513 307/66 |
| 6,223,369 B1 * | 5/2001 | Maier | A61G 7/05707 5/706 |
| 7,322,652 B1 | 1/2008 | Tache | |
| 2005/0081300 A1 * | 4/2005 | O'Reagan | A61G 7/05715 5/713 |

(Continued)

FOREIGN PATENT DOCUMENTS

EP    0657057 A1    6/1995

*Primary Examiner* — Max Noori
(74) *Attorney, Agent, or Firm* — Vichit Chea; Price Heneveld LLP

(57) ABSTRACT

A cushion module is provided herein and includes a mounting manifold and a retaining plate. An array of pneumatic assemblies is coupled to and disposed between the mounting manifold and the retaining plate. Each pneumatic assembly includes a pneumatic cylinder having a piston rod and configured to receive pressurized air for moving the piston rod to a selected position. The pressurized air supplied to each pneumatic cylinder is variable and the piston rods collectively define a support surface having variable contour and firmness, and on which an object is rested to assess the comfortability of the support surface.

20 Claims, 4 Drawing Sheets

(56) References Cited

U.S. PATENT DOCUMENTS

2011/0088164 A1* 4/2011 Mandjoubi ........ A61G 7/05769
                                                                5/81.1 R
2011/0131839 A1* 6/2011 Ballin .................. A43B 13/186
                                                                36/141

* cited by examiner

CUSHION MODULE FOR ASSESSING COMFORTABILITY

FIELD OF THE INVENTION

The present disclosure generally relates to devices for testing comfort, and more particularly, to devices for simulating a cushion on which an object may be rested.

BACKGROUND OF THE DISCLOSURE

Current devices and methods for testing the comfort of a seat cushion or other support structure generally require costly prototypes of each desired contour and firmness. Furthermore, these devices may also be ill-equipped to provide accurate pressure and deflection data. As such, a cushion module is provided herein having a support surface of variable contour and firmness. Moreover, the cushion module is operable to provide data that is useful for assessing the comfortability of the support surface being tested.

SUMMARY OF THE DISCLOSURE

According to one aspect of the present disclosure, a cushion module is provided and includes an array of double acting pneumatic cylinders, each having a piston rod and configured to receive pressurized air for moving the piston rod to a selected position. The pressurized air supplied to each pneumatic cylinder is variable and the piston rods collectively define a support surface having variable contour and firmness, and on which an object is rested to assess the comfortability of the support surface.

According to another aspect of the present disclosure, a cushion module is provided and includes a mounting manifold and a retaining plate. An array of pneumatic assemblies is coupled to and disposed between the mounting manifold and the retaining plate. Each pneumatic assembly includes a pneumatic cylinder having a piston rod and configured to receive pressurized air for moving the piston rod to a selected position. The pressurized air supplied to each pneumatic cylinder is variable and the piston rods collectively define a support surface having variable contour and firmness, and on which an object is rested to assess the comfortability of the support surface.

According to yet another aspect of the present disclosure, a method is provided and includes the steps of: providing an array of double acting pneumatic cylinders, each having a piston rod; supplying pressurized air to each pneumatic cylinder for moving the corresponding piston rod to a selected position, wherein the piston rods collectively define a support surface having variable contour and firmness; and resting an object on the support surface to assess the comfortability thereof.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
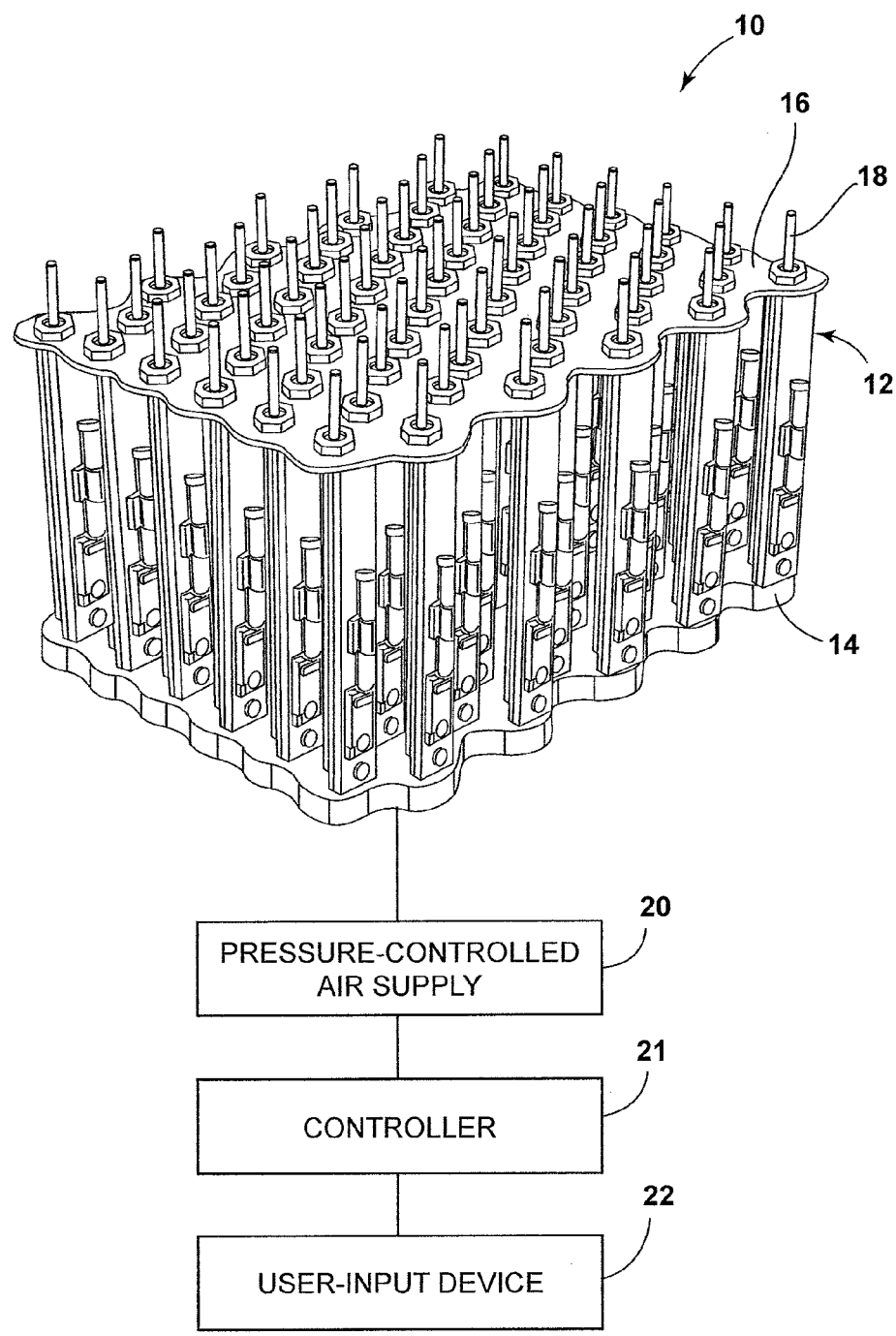
FIG. 1 illustrates one embodiment of a cushion module.

Referring to FIG. 1, a cushion module 10 is shown according to one embodiment. The cushion module 10 includes an array of densely packed pneumatic assemblies 12 coupled to and substantially disposed between a mounting manifold 14 and a retaining plate 16. Each pneumatic assembly 12 may be similarly sized and dimensioned and includes a piston rod 18 that is linearly reciprocating. In operation, each pneumatic assembly 12 utilizes air pressure to move its corresponding piston rod 18 to a selected position via an outstroke or an instroke. Pressurized air is supplied to each pneumatic assembly 12 via a pressure-controlled air supply 20. A controller 21 may operate the pressure-controlled. air supply 20 and certain components of each pneumatic assembly 12, as described herein, to modulate the air pressure therein in response to commands received via a user-input device 22. The air pressure in a given pneumatic assembly 12 may be independently modulated and is variable thereby enabling the corresponding piston rod 18 to be moved to the selected position and exhibit a determinable resistance against an opposing force. With respect to the embodiments described herein, the piston rods 18 collectively define a support surface having variable contour and firmness, and on which an object is rested to assess the comfortability of the support surface.

Figure 2:
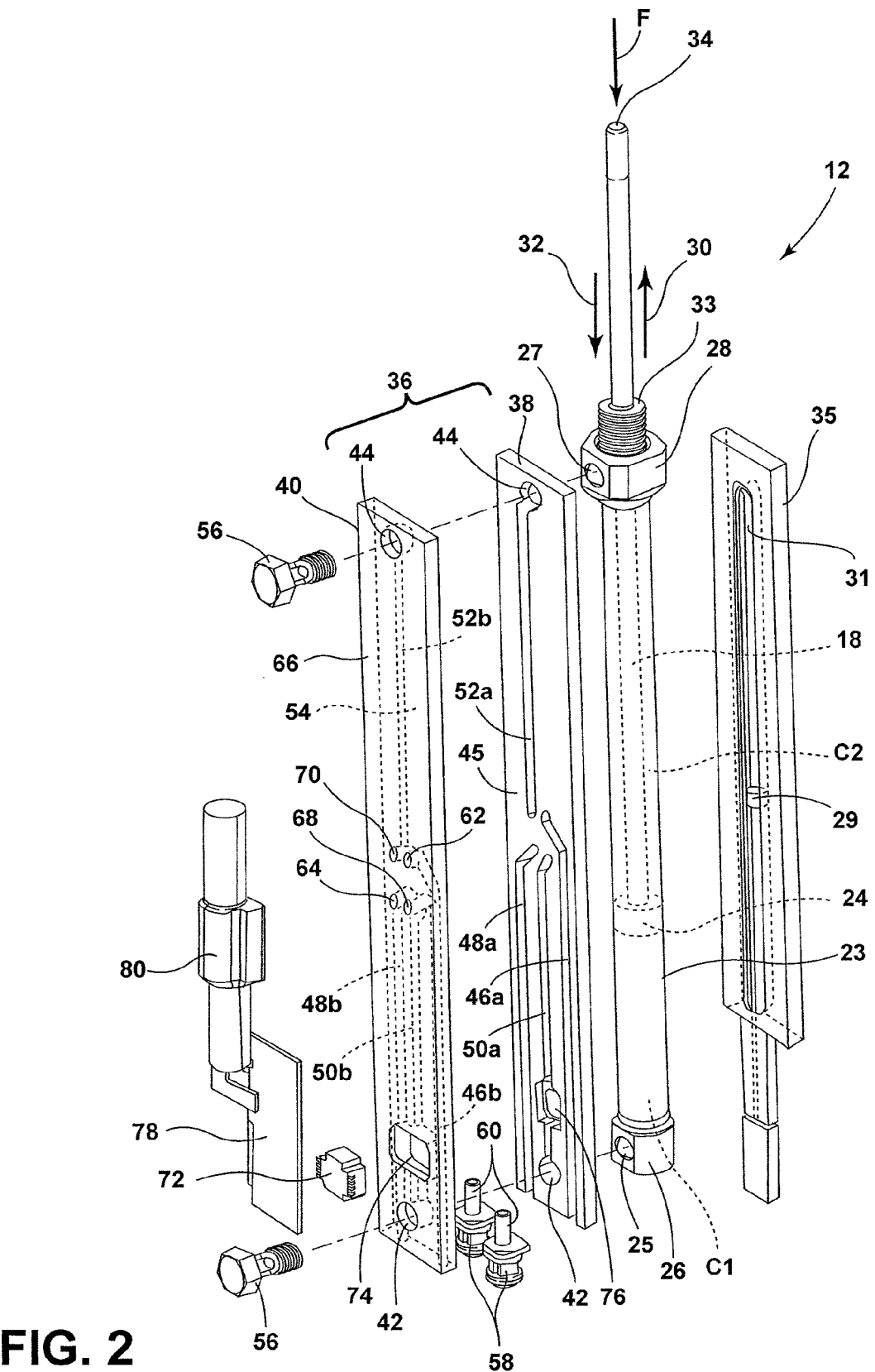
FIG. 2 is an exploded view of a pneumatic assembly according to one embodiment.

Referring to FIG. 2, an exploded view of a pneumatic assembly 12 is shown according to one embodiment. The pneumatic assembly 12 includes a double acting pneumatic cylinder 23 that at least partially houses a piston rod 18, which is shown extended at an intermediate position. The piston rod 18 includes a seal member 24 configured to separate the interior of the pneumatic cylinder 23 into a first and second air compartment C1, C2. The pneumatic cylinder 23 includes a first air inlet 25 disposed at a bottom end 26 to allow pressurized air to enter the first compartment C1 and a second air inlet 27 disposed at a top end 28 to allow pressurized air to enter the second compartment C2. Assuming the piston rod 18 is not fully extended, when pressurized air is only supplied to the first compartment C1 via the first air inlet 25, the corresponding air pressure inside the first compartment C1 causes an outstroke of the piston rod 18 in the direction generally specified by arrow 30. Conversely, and assuming the piston rod 18 is not fully retracted, when pressurized air is only supplied to the second compartment C2 via the second air inlet 27, the corresponding air pressure inside the second compartment C2 causes an instroke of the piston rod 18 in the direction generally specified by arrow 32. Accordingly, the selected position of the piston rod 18 and its relative resistance to a force F applied to a tip portion 34 of the piston rod 18 may be determined by modulating the air pressure in one or both of the first and second compartments C1, C2 of the pneumatic cylinder 23. With respect to the present embodiment, the piston rod 18 may extend or retract via a threaded neck portion 33 of the pneumatic cylinder 23.

With continued reference to FIG. 2, the pneumatic assembly 12 may also include a position sensor 35 such as a magnetic position sensor operably coupled to the pneumatic cylinder 23. The position sensor 35 may be communicatively coupled to the controller 21 and operable to transmit position data, which includes the current position of the piston rod 18, to the controller 21. In the illustrated embodiment, the position sensor 35 includes a magnet 29 that is displaceable inside a channel 31. The magnet 29 is magnetically coupled to the piston rod 18 and is configured to move alongside the piston rod 18 thereby enabling the position sensor 35 to relay the current position of the piston rod 18 to the controller 21.

Additionally, a manifold 36 may be operably coupled to the pneumatic cylinder 23 opposite the magnetic position sensor 35 and includes a first plate member 38 disposed proximate to the pneumatic cylinder 23 and a second plate member 40 arranged in parallel with the first plate member 38 and disposed distal to the pneumatic cylinder 21 In the present embodiment, the first and second plate members 38, 40 are similarly sized and dimensioned and. extend substantially the length of the pneumatic cylinder 23. Each of the first and second plate members 38, 40 include a first through-hole 42 in alignment with the first air inlet 25 of the pneumatic cylinder 23. Each of the first and second plate members 38, 40 also include a second through-hole 44 in alignment with the second air inlet 27 of the pneumatic cylinder 23.

With respect to the present embodiment, a surface 45 of the first plate member 38 defines a number of channels 46a, 48a, 50a, 52a and faces a surface 54 of the second plate member 40 that defines a number of complimentary channels 46b, 48b, 50b, 52b such that when the first and second plate members 38, 40 are in abutting contact, a first air passage is defined by channels 46a and 46b, a second air passage is defined by channels 48a and 48b, a third air passage is defined by channels 50a and 50b, and a fourth air passage is defined by channels 52a and 52b.

To assemble the manifold 36 to the pneumatic cylinder 23, the first and second plate members 38, 40 are pressed together such that surface 45 of the first plate member 38 is in abutting contact with surface 54 of the second plate member 40. The manifold 36 is then positioned relative the pneumatic cylinder 23 such that the first and second through-holes 42, 44 of the first and second plate members 38, 40 are aligned with the first and second air inlets 25, 27 of the pneumatic cylinder 23 and removably coupled to the pneumatic cylinder 23 via a pair of banjo bolts 56. one of which is inserted through the first through-holes 42 of the first and second plate members 38, 40 and engaged to the first air inlet 25 of the pneumatic cylinder 23 and the other of which is inserted through the second through-holes 44 of the first and second plate members 38, 40 and engaged to the second air inlet 27 of the pneumatic cylinder 23.

Additionally, a pair of connecting members 58 is coupled to the manifold 36 via a corresponding feed neck 60, one of which is insertably engaged to an opening defined by channels 46a and 46b and the other of which is insertably engaged to an opening defined by channels 48a and 48b. In operation, pressurized air received from the pressure-controlled air supply 20 is fed to the first and/or second air passages via the corresponding connecting members 58 and is ultimately delivered to a corresponding port 62, 64 formed in surface 66 of the second plate member 40. Another set of ports, shown as ports 68 and 70, are also formed in surface 66 and connect to one of the third and fourth air passages. In the illustrated embodiment, pressurized air fed through port 68 enters the third air passage and is ultimately delivered to the first compartment C1 of the pneumatic cylinder 23 via the through-holes 42 of the first and second plate members 38, 40 and the first air inlet 25 of the pneumatic cylinder 23. Conversely, pressurized air fed through port 70 enters the fourth air passage and is ultimately delivered to the second compartment C2 of the pneumatic cylinder 23 via the through-holes 44 of the first and second plate members 38, 40 and the second air inlet 27 of the pneumatic cylinder 23.

With further reference to FIG. 2, a pressure sensor 72, such as a pressure transducer, is coupled to the manifold 36 and is configured to monitor the air pressure therein, and by extension, also monitor the air pressure inside the pneumatic cylinder 23. Or said differently, the pressure sensor 72 may be operable to monitor the firmness exerted by the piston rod 18, The pressure sensor 72 may be communicatively coupled to the controller 21 and is operable to transmit air pressure data to the controller 21. According to one embodiment, the pressure sensor 72 of each pneumatic assembly 12 measures the change in air pressure inside its corresponding pneumatic cylinder 23 when an object is rested on the support surface of the cushion module 10 and the measurements are sent to the controller 21 to generate a pressure map. Likewise, when the object is rested on the cushion module 10, the position sensor 35 of each pneumatic assembly 12 measures the current position of its corresponding piston rod 18 and the measurements are sent to the controller 21 to generate a contour map.

With respect to the present embodiment, the pressure sensor 72 is positioned inside a cavity connected to an intermediate portion of the third air passage and defined by a through-hole 74 formed through the second plate member 40 and a recess 76 formed in surface 45 of the first plate member 38. In such a configuration, the pressure sensor 72 is operable to directly monitor the air pressure inside the third air passage, and by extension, also monitor the air pressure inside the first compartment C1 of the pneumatic cylinder 23. The pressure sensor 72 may be held in place via a backplate 78 coupled to surface 66 of the second plate member 40. The backplate 78 may also be configured to support a valve 80 that is operably connected to surface 66 of the second plate member 40 and is in communication with ports 62, 64, 68, and 70.

In operation, the valve 80 may be operably coupled to the controller 21 and is operable to modulate the air pressure inside each of the first and second compartments C1, C2 of the pneumatic cylinder 23. For example, the valve SO may be operated to either allow or prevent pressurized air received from one of the first and second air passages to feed into the first compartment C1 of the pneumatic cylinder 23 via the third air passage. The valve 80 may also be operated to either allow or prevent pressurized air received from the other of the first and second air passages to feed into the second compartment C2 of the pneumatic cylinder 23 via the fourth air passage. Thus, the creation of a contour for the support surface is achieved by modulating the air pressure inside each of pneumatic cylinder 23 until the corresponding piston rods 18 are moved to the selected position. It is to be understood that the selected position for a given piston rod 18 may or may not be the same as that of another. By moving at least a number of piston rods 18 to different positions, non-linear contours are achievable. Furthermore, by modulating the amount of air pressure inside each pneumatic cylinder 23, some portions of the support surface may offer greater support than others when an object is rested on the cushion module 10.

Figure 3:
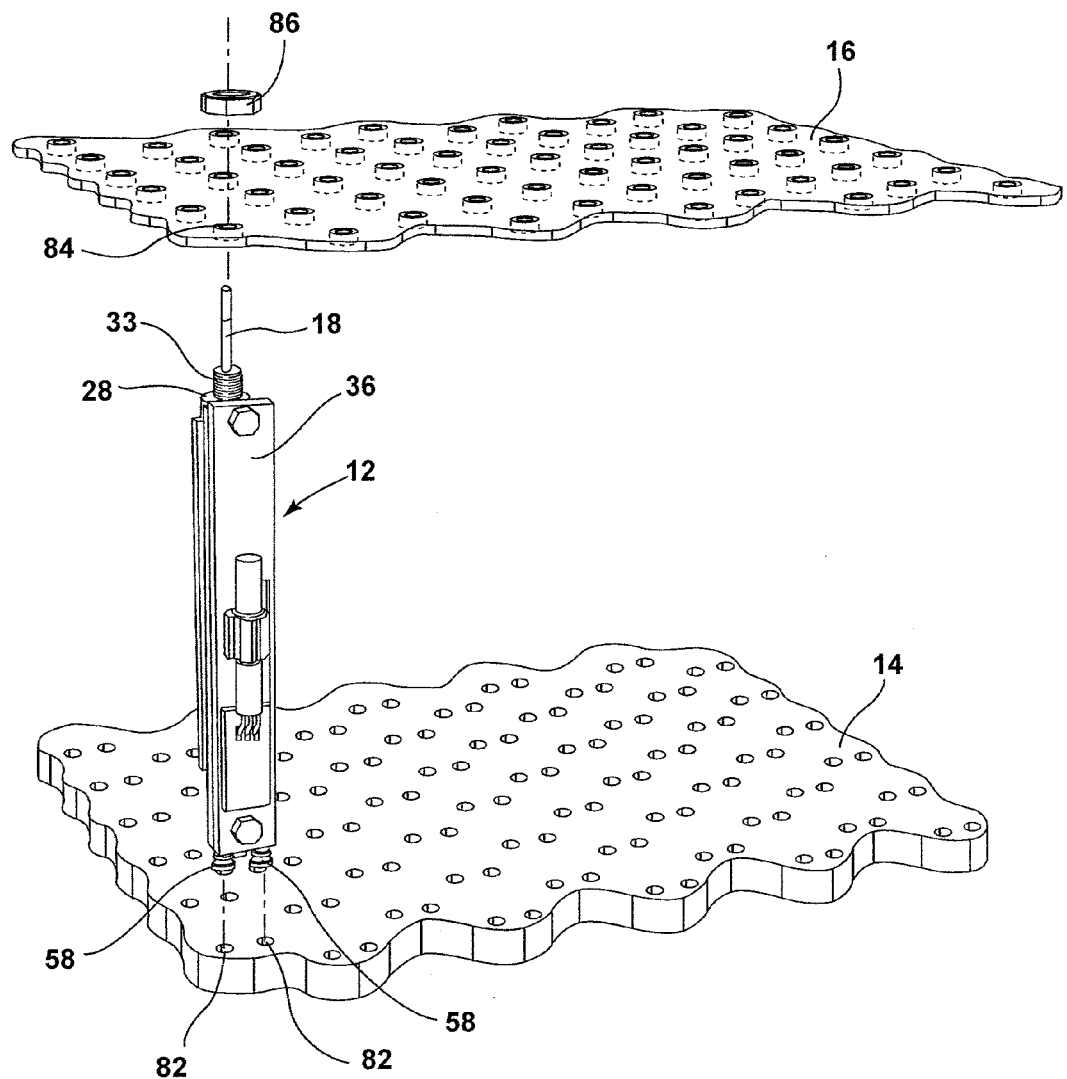
FIG. 3 illustrates the pneumatic assembly shown in FIG. 2 being engaged to a mounting manifold and a retaining plate, according to one embodiment.

Referring to FIG. 3, the pneumatic assembly 12 may be mounted to the mounting manifold 14 by inserting each connecting member 58 in a corresponding through-hole 82 of the mounting manifold 14 such that the pneumatic assembly 12 is disposed substantially upright relative to the mountain block 14. To prevent against air leakage, the connecting members 58 are sealed to the mounting manifold 14. According to one embodiment, the through-holes 82 of the mounting manifold are interconnected, In this manner, pressurized air from the pressure-controlled air supply 20 may be delivered via a single line to the mounting manifold 14 and subsequently distributed to each pneumatic assembly 12.

Once the pneumatic assembly 12 has been secured to the mounting manifold 14, the retaining plate 16 is vertically aligned with the mounting manifold 14 so that the piston rod 18 and neck portion 33 of the pneumatic cylinder 23 may be received through a corresponding through-hole 84 of the retaining plate 16. As a result, the retaining plate 16 will come to rest against the top end 28 of the pneumatic cylinder 23 and may be removably secured thereto using a mechanical fastener 86 engaged to the neck portion 33 of the pneumatic cylinder 23. While not shown, it is to be understood that other pneumatic assemblies may be similarly mounted between the mounting manifold 14 and the retaining plate 16.

Figure 4:
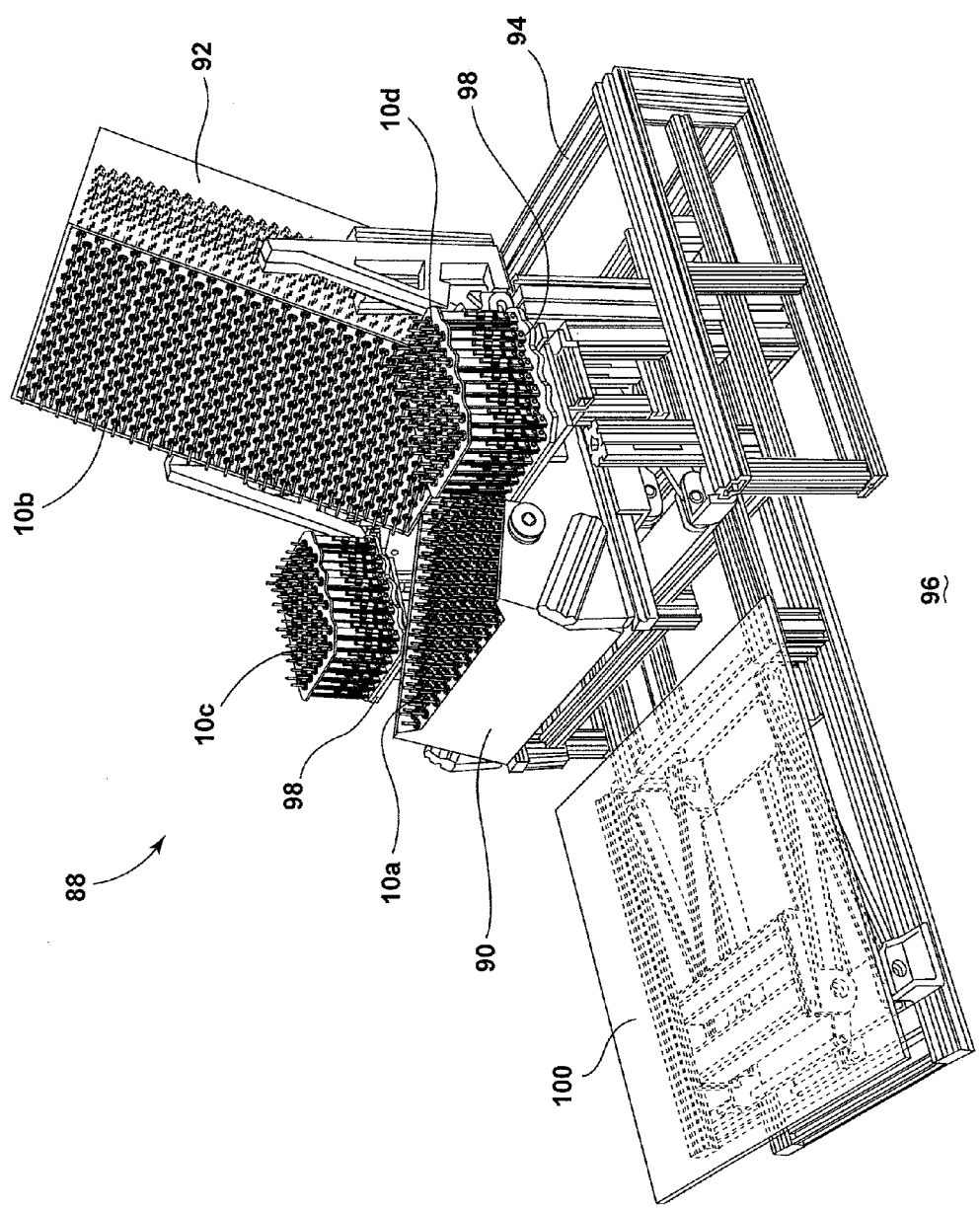
FIG. 4 illustrates one embodiment of a seat assembly incorporating a number of cushion modules for simulating a seat, a seatback, and one or more armrests.

Referring to FIG. 4, a seating assembly 88 is shown according to one embodiment and generally functions as a testing station for conducting a variety of experiments related to the comfort of a test subject sitting in the seating assembly 88. Accordingly, it is contemplated that the seating assembly 88 may be sized and dimensioned in a manner similar to that found in a passenger vehicle such as, but not limited, an automobile, a boat, a train, a plane, and the like. As shown, the seating assembly 88 generally includes one or more cushion modules, exemplarily shown as cushion modules 10a, 10b, 10c, and 10d. In the present embodiment, cushion modules 10a and 10b are configured to fit in a seat 90 and seatback 92, respectively. The seat 90 and seatback 92 may each be supported by a frame member 94 resting atop a ground surface 96 and may each be adjustable as is known in the art. Cushion modules 10c and 10d are each located off to a side of the seat 90 and are each disposed on a respective platform 98 of the frame member 94. The seating assembly 88 may optionally include a footrest platform 100 that is adjustable in height relative to the seat 90. In operation, each of the cushion modules 10a-10d may be operably coupled to the pressure-controlled air supply 20 and are independently controlled such that the support surfaces of each of the cushion modules 10a-10d may be variously contoured and may provide more support in some areas than others.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A cushion module comprising:
an array of double acting pneumatic cylinders, each having a piston rod and configured to receive pressurized air for moving the piston rod to a selected position;
wherein the pressurized air supplied to each pneumatic cylinder is variable; and
wherein the piston rods collectively define a support surface having variable contour and firmness for resisting a force applied by an object rested directly on the support surface to assess comfortability thereof.

2. The cushion module of claim 1, wherein each pneumatic cylinder is operably coupled to a manifold uniquely associated therewith and configured to receive pressurized air from an air supply.

3. The cushion module of claim 2, wherein each manifold comprises a valve configured to modulate the supply of pressurized air to the corresponding pneumatic assemblyvia at least one of a first and second air inlet of the corresponding pneumatic assembly.

4. The cushion module of claim 3, wherein each manifold comprises a pressure sensor configured to monitor an air pressure inside the corresponding pneumatic cylinder.

5. The cushion module of claim 4, wherein each pneumatic cylinder is operably coupled to a uniquely associated position sensor configured to sense a current position of the corresponding piston rod.

6. The cushion module of claim 5, wherein the pressure sensor and the position sensor supply data for generating at least one of a contour map and a pressure map.

7. The cushion module of claim 2, wherein each manifold is secured to a mounting manifold such that the corresponding pneumatic cylinders are held substantially upright relative to the mounting manifold, and wherein a retaining plate is coupled to each of the pneumatic cylinders such that the pneumatic cylinders are substantially disposed between the mounting manifold and the retaining plate.

8. A cushion module comprising:
a mounting manifold;
a retaining plate;
an array of pneumatic assemblies coupled to and disposed between the mounting manifold and the retaining plate, wherein each pneumatic assembly comprises:
a pneumatic cylinder having a piston rod and configured to receive pressurized air for moving the piston rod to a selected position;
wherein the pressurized air supplied to each pneumatic cylinder is variable; and
wherein the piston rods collectively define a support surface having variable contour and firmness, and on which an object is directly rested to assess comfortability of the support surface.

9. The cushion module of claim 8, wherein each pneumatic cylinder is operably coupled to a manifold uniquely associated therewith and configured to receive pressurized air from an air supply.

10. The cushion module of claim 9, wherein each manifold comprises a valve configured to modulate the supply of pressurized air to the corresponding pneumatic assembly via at least one of a first and second air inlet of the corresponding pneumatic assembly.

11. The cushion module of claim 10, wherein each manifold comprises a pressure sensor configured to monitor an air pressure inside the corresponding pneumatic cylinder.

12. The cushion module of claim 11, wherein each pneumatic cylinder is operably coupled to a uniquely associated position sensor configured to sense a current position of the corresponding piston rod.

13. The cushion module of claim 12, wherein the pressure sensor and the position sensor supply data for generating at least one of a contour map and a pressure map.

14. A method comprising the steps of:
providing an array of double acting pneumatic cylinders, each having a piston rod;
supplying pressurized air to each pneumatic cylinder for moving the corresponding piston rod to a selected position, the piston rods collectively behaving as a support surface having variable contour and firmness;
resting an object directly on the support surface; and
assessing comfortability of the support surface based on a resistance provided by the piston rods against the force applied to the support surface.

15. The method of claim 14, wherein each pneumatic cylinder is operably coupled to a manifold uniquely associated therewith and configured to receive pressurized air from an air supply.

16. The method of claim 15, wherein each manifold comprises a valve configured to modulate the supply of pressurized air to the corresponding pneumatic assembly via at least one of a first and second air inlet of the corresponding pneumatic assembly.

17. The method of claim 16, wherein each manifold comprises a pressure sensor configured to monitor an air pressure inside the corresponding pneumatic cylinder.

18. The method of claim 17, wherein each pneumatic cylinder is operably coupled to a uniquely associated position sensor configured to sense a current position of the corresponding piston rod.

19. The method of claim 18, wherein the pressure sensor and the position sensor supply data for generating at least one of a contour map and a pressure map.

20. The method of claim 15, wherein each manifold is secured to a mounting manifold such that the corresponding pneumatic cylinders are held substantially upright relative to the mounting manifold, and wherein a retaining plate is coupled to each of the pneumatic cylinders such that the pneumatic cylinders are substantially disposed between the mounting manifold and the retaining plate.

* * * * *